UNITED STATES PATENT OFFICE.

BERNHARD HEYMANN, OF WIESDORF-ON-THE-RHINE, OSKAR DRESSEL, OF MÜLHEIM-ON-THE-RHINE, RICHARD KOTHE, OF VOHWINKEL, NEAR ELBERFELD, AND ANTON OSSENBECK, OF COLOGNE-ON-THE-RHINE, GERMANY, ASSIGNORS TO SYNTHETIC PATENTS CO., INC., OF NEW YORK, N. Y., A CORPORATION OF NEW YORK.

UREIDS OF SUBSTITUTED AMINONAPHTHOL SUBSTANCES.

1,308,071.      Specification of Letters Patent.      Patented July 1, 1919.

No Drawing.      Application filed March 19, 1914. Serial No. 825,868.

*To all whom it may concern:*

Be it known that we, BERNHARD HEYMANN, OSKAR DRESSEL, RICHARD KOTHE, and ANTON OSSENBECK, doctors of philosophy, chemists, citizens of the German Empire, residing at, respectively, Wiesdorf-on-the-Rhine, Mülheim-on-the-Rhine, Vohwinkel, near Elberfeld, and Cologne-on-the-Rhine, Germany, have invented new and useful Improvements in Ureids of Substituted Aminonaphthol Substances, of which the following is a specification.

The present invention relates to the production of substitution derivatives of 1.8-aminonaphthol sulfonic acids in the amino group by means of nitro derivatives of the halids of aromatic acids, e. g. aromatic carboxylic acids, aromatic sulfo acids, etc., reduction to the corresponding amino products, and finally condensation of these substances to ureids.

The above mentioned reduced substitution derivatives of aminonaphtholsulfonic acids may be again substituted by the above acid halids and again reduced before they are condensed to furnish the ureids.

The ureids of these substituted aminonaphthol sulfonic acids are characterized by containing in their molecule an aggregation of the group:

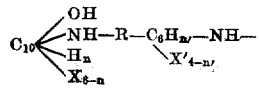

in which R stands for a divalent group containing an acidyl radical, such as —CO—, the residue of the carboxyl group; —SO$_2$—, the residue of the sulfonic group; —CO—CH=CH—, the residue of the cinnamic acid; —CO—CH$_2$—, the residue of the phenylacetic acid, etc.; $n$ gives the number of hydrogen atoms left unsubstituted in the naphthalene nucleus; and X substituting groups, such as sulfonic groups; $n'$ gives the number of hydrogen atoms left unsubstituted in the benzene nucleus; and X' substituting groups e. g. Cl, Br, —CH$_3$—, —OCH$_3$, etc. They are further characterized by their property of furnishing azo-dyestuffs when coupled with diazotized anilin, etc. As starting material the 1.8-aminonaphthol sulfonic acids may be employed e. g. mono-, di- or higher sulfonated derivatives. These aminonaphthol substances are substituted by such nitro derivatives of halids of aromatic acids as para-nitro-benzoyl chlorid of the formula:

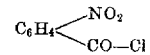

meta-nitroanisoyl chlorid, etc., or by meta-nitro-benzol-sulfo chlorid of the formula:

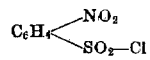

meta-nitro-cinnamyl-chlorid of the formula:

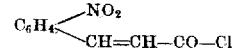

etc.

The reduction of these substituted aminonaphthol sulfonic acids is carried out by means of iron and acetic acid or by any other appropriate method furnishing products of the following general formula:

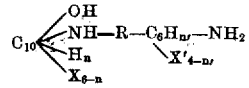

Finally these amino derivatives of the substituted 1.8-aminonaphthol sulfonic acids are treated with phosgen, etc. to furnish the ureids with the following general formula:

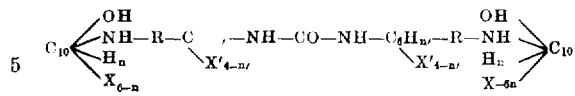

or, as above stated, the acid halids are repeatedly introduced into the aminonaphthol substances, derivatives of the following general formula are obtained:

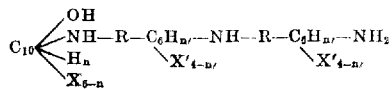

which upon treatment with phosgen furnish ureids of the following general formula:

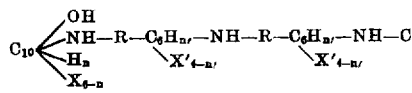

In the same manner three, four, or still more molecules of the acid halids might be introduced into the aminonaphthol substances and correspondingly more complicated substitution derivatives and finally ureids are obtained.

In all these general formulæ R stands for a group containing an acidyl radical.

For the formation of the substituted aminonaphthol substances nitroderivatives of various acid halids may be employed, so that in the general formula last given one R may stand for —CO— and the other for —SO$_2$— or —CO—CH=CH— if nitrobenzoylchlorid, nitrobenzolsulfochlorid or nitrocinnamylchlorid were used for introduction into the aminonaphthol substance.

The new products possess therapeutic value, as they show strong blood-parasite-destroying qualities and comparatively small injurious effect toward the host.

They form salts with alkali, alkalin earths or heavy metals e. g. Na, Ba, Sr, Cu, Zn, Hg, Ag, which retain the valuable therapeutic properties.

They are also useful in the synthesis of azodyestuffs as they combine with diazotized amins.

In carrying out our process practically we may proceed as follows:—

Example 1: 46 parts of the acid sodium salt of the substitution derivative obtained from the reaction of para-nitrobenzoylchlorid on 1.8-aminonaphthol-4.6-disulfonic acid and subsequent reduction which has the following constitution:

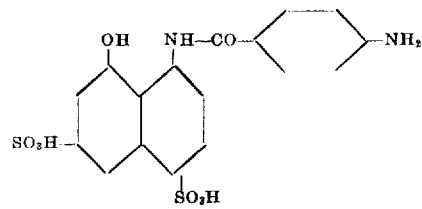

are dissolved in 1000 parts of water and treated with carbonate of soda, until the neutral salt is formed. Then 50 parts of crystallized sodium acetate are added and while stirring phosgen is introduced in a slow current at a temperature of 40–45° C. The treatment with phosgen is continued until a test sample shows no reaction with nitrite which means that there is no amino substance present any more. Already during the operation the ureid separates for the greatest part. After the end of the reaction chlorid of sodium is added in order to complete the separation. The free acid has the following constitution:

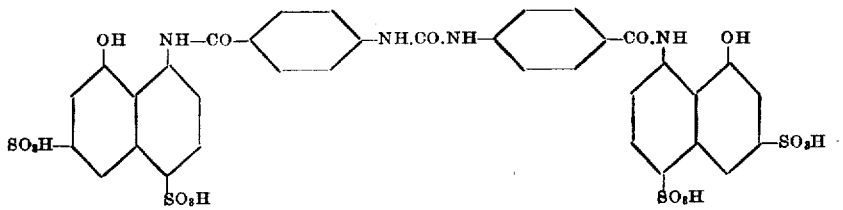

By dissolving the acid by means of carbonate of soda and subsequent addition of chlorid of sodium, the neutral salt of the above acid is precipitated as yellowish powder. Dilute solutions of this substance already possess strongly trypanosomes-destroying action. The acid, when coupled with diazotized anilin, furnishes a clear, blue-red dyestuff.

Example 2: 58 parts of the acid sodium salt obtained by the double introduction of m-nitrobenzoyl residue into 1.8-aminonaphthol-3.6-disulfonic acid and subsequent reduction which possesses the following formula:

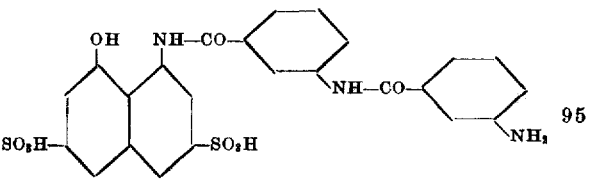

are dissolved in about 1000 parts of water and carbonate of soda to form the neutral salt. Then 50 parts of crystallized acetate of sodium are added, and as described in Example 1 phosgen is introduced into this solution. The new acid obtained has the following formula:

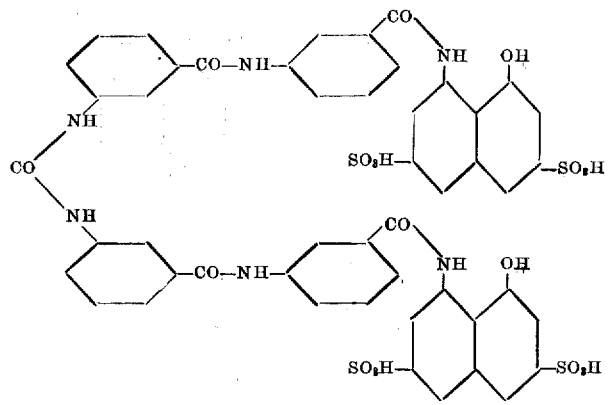

The neutral sodium salt of this acid after being filtered and dried is a powder which is soluble in water with yellowish color.

Dilute solutions of this salt also possess strong trypanosomes-destroying action. The acid also forms azodyestuffs, when coupled with diazotized anilin.

Example 3: 50 parts of the acid sodium salt obtained by the action of meta-nitrobenzolsulfochlorid on 1.8-aminonaphthol-3.6-disulfonic acid and subsequent reduction which possesses the following formula:

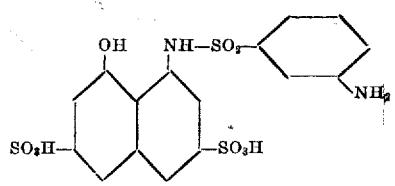

are dissolved with water and the required quantity of carbonate of soda to furnish the neutral salt. Then 50 parts of crystallized sodium acetate are added and phosgen is introduced as described in Example 1. The thus formed acid has the following formula:

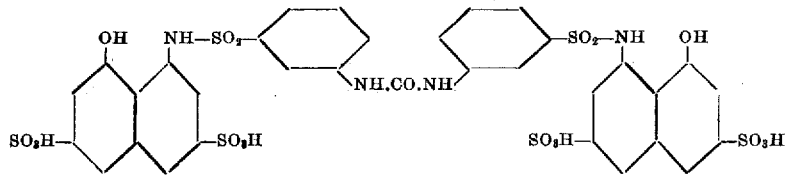

By dissolving the same with the addition of carbonate of soda and precipitating it by chlorid of sodium the neutral salt is obtained which is easily soluble in water. In the dry form the neutral salt is a faintly reddish powder. It forms azodyes with diazobenzene.

Example 4: 64.5 parts of the acid sodium salt obtained by the action of nitroanisoyl chlorid on the reduced substituted derivative obtained from nitroanisoylchlorid and 1.8-aminonaphthol-4.6-disulfonic acid and subsequent reduction which possesses the following formula:

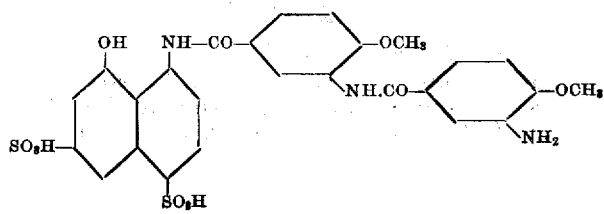

are dissolved in water and carbonate of soda to form the neutral salt. Then 50 parts of crystallized sodium acetate are added and phosgen is introduced as in Example 1. The new acid thus obtained has the following formula:

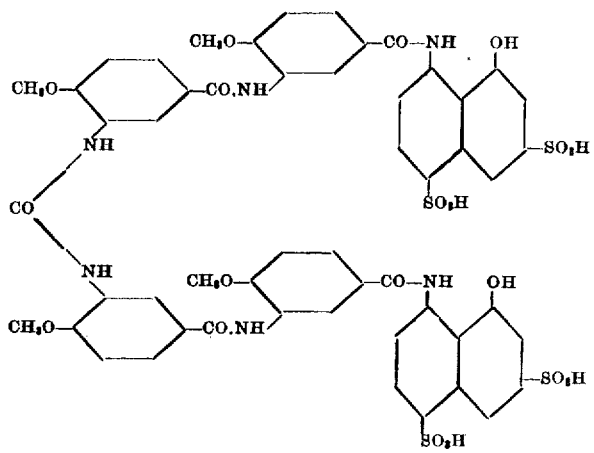

The neutral sodium salt in the dry form is a reddish powder easily soluble in water.

Example 5: 50 parts of the acid salt of the substitution derivative obtained from the reaction of meta-nitro-cinnamyl-chlorid on 1.8-aminonaphthol-4.6-disulfonic acid and subsequent reduction which has the following constitution:

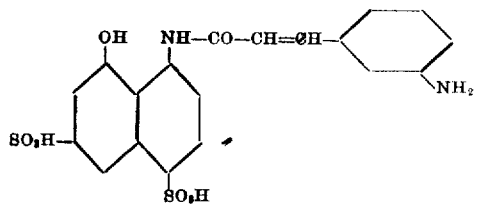

are dissolved in 1000 parts of water and treated with carbonate of soda, until the neutral salt is formed. Then 50 parts of crystallized sodium acetate are added and while stirring phosgen is introduced in a slow current at a temperature of 40-45° C. The treatment with phosgen is continued until a test sample shows no reaction with nitrit which means that there is no amino substance present any more. Already during the operation the ureid separates for the greatest part. After the end of the reaction chlorid of sodium is added in order to complete the separation. The free acid has the following constitution:

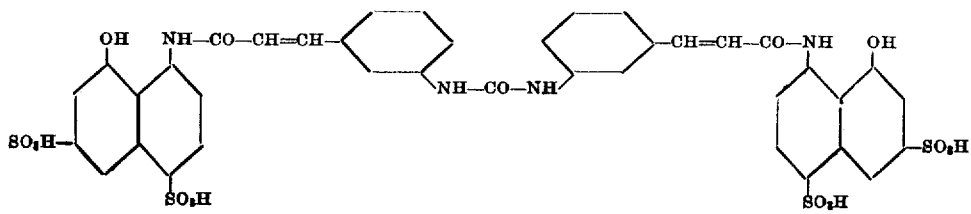

By dissolving the acid by means of carbonate of soda and subsequent addition of chlorid of sodium, the neutral salt of the above acid is precipitated as yellowish powder. Dilute solutions of this substance already possess strongly *Spirochœta*-destroying action. The acid, when coupled with diazotized anilin, furnishes a clear red dyestuff.

Example 6: 63 parts of the acid sodium salt of the substitution derivative obtained by condensation of para-nitrocinnamylchlorid with the product of the reaction of para-nitrocinnamylchlorid on 1.8-amino-naphthol- 4.6-disulfonic acid and subsequent reduction which has the following constitution:

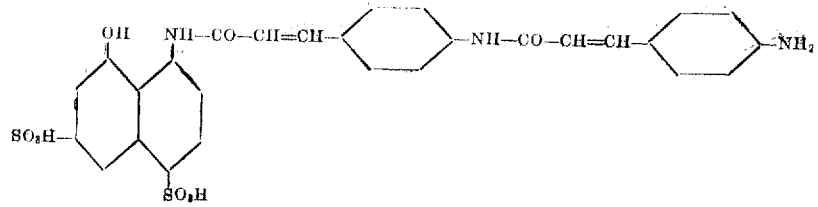

are dissolved in 1000 parts of water and treated with carbonate of soda, until the neutral salt is formed. Then 50 parts of crystallized sodium carbonate are added and while stirring phosgen is introduced in a slow current at a temperature of 40–45° C. The treatment with phosgen is continued until a test sample shows no reaction with nitrit which means that there is no amino substance present any more. Already during the operation the ureid separates for the greatest part. After the end of the reaction chlorid of sodium is added in order to complete the separation. The free acid has the following constitution:

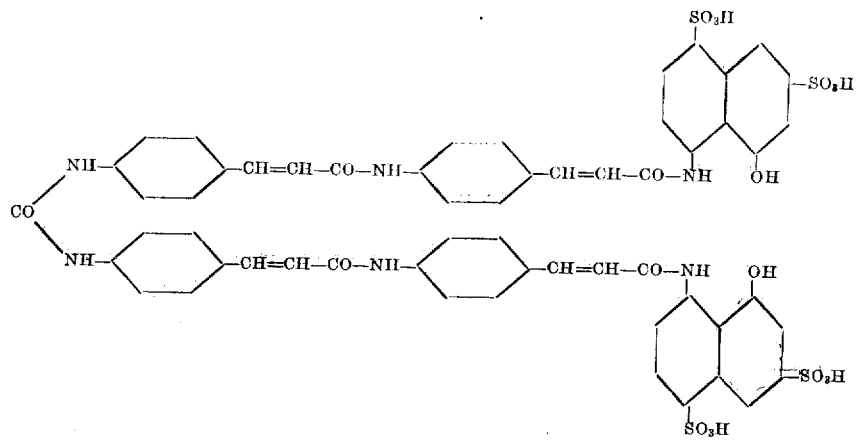

By dissolving the acid by means of carbonate of soda and subsequent addition of chlorid of sodium, the neutral salt of the above acid is preciptated as yellowish powder. The acid, when coupled with diazotized anilin, furnishes a clear red dyestuff.

We claim:—

1. The process of producing ureids having valuable therapeutic properties which comprises treating with phosgen a naphthalene derivative whose molecule contains the following atomic grouping:

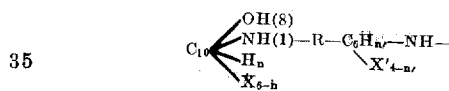

in which R stands for a divalent group containing an acidyl radical, $n$ a number less than 7, X for substituting groups, $n'$ a number less than 5, and X' for substituting groups, the aryl nucleus, which is most remote from the naphthalene nucleus represented above by $C_{10}$, having a free amino group attached thereto.

2. The process of producing ureids having valuable therapeutic properties which comprises treating with phosgen a salt of a naphthalene derivative whose molecule contains the following atomic grouping:

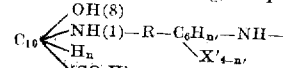

in which R stands for a divalent group containing an acidyl radical, $n$ a number less than seven, $n'$ a number less than 5, and X' for substituting groups; the aryl nucleus, which is most remote from the naphthalene nucleus represented above by $C_{10}$, having a free amino group attached thereto.

3. The process of producing ureids having valuable therapeutic properties which comprises treating with phosgen a salt of a naphthalene derivative whose molecule contains the following atomic grouping:

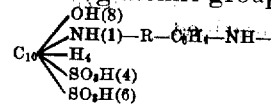

in which R stands for a divalent group containing an acidyl radical, the aryl nucleus, which is most remote from the naphthalene nucleus represented above by $C_{10}$, having a free amino group attached thereto.

4. The process of producing ureids having valuable therapeutic properties which comprises treating with phosgen a salt of a naphthalene derivative whose molecule contains the following atomic grouping:

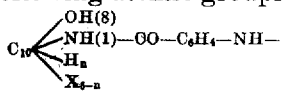

in which $n$ stands for a number less than seven, X for substituting groups; the aryl nucleus, which is most remote from the naphthalene nucleus represented above by $C_{10}$, having a free amino group attached thereto.

5. The process of producing ureids having valuable therapeutic properties which comprises treating with phosgen a salt of a naphthalene derivative whose molecule contains the following atomic grouping:

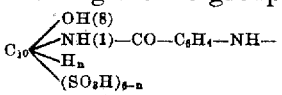

in which $n$ stands for the number of hydrogen atoms left unsubstituted in the naphthalene nucleus; the aryl nucleus, which is most remote from the naphthalene nucleus represented above by $C_{10}$, having a free amino group attached thereto.

6. The process of producing ureids having valuable therapeutic properties which comprises treating with phosgen a salt of a naphthalene derivative whose molecule contains the following atomic grouping:

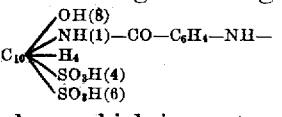

the aryl nucleus, which is most remote from the naphthalene nucleus represented above by $C_{10}$, having a free amino group attached thereto.

7. The process of producing ureids having valuable therapeutic properties which comprises treating with phosgen a naphthalene derivative having the following formula:

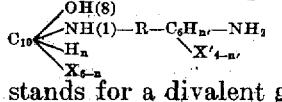

in which R stands for a divalent group containing an acidyl radical, $n$ a number less than seven, X for substituting groups, $n'$ a number less than five, and X' for substituting groups.

8. The process of producing ureids having valuable therapeutic properties which comprises treating with phosgen a salt of a naphthalene derivative having the following formula:

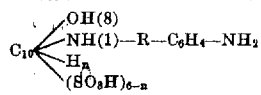

in which R stands for a divalent acidyl radical, and $n$ for a number less than seven.

9. The process of producing ureids having valuable therapeutic properties which comprises treating with phosgen a salt of a naphthalene derivative having the following formula:

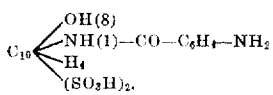

10. The process of producing ureids having valuable therapeutic properties which comprises treating with phosgen in the presence of sodium acetate at an elevated temperature a salt of a naphthalene derivative having the following formula:

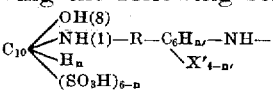

in which R stands for a divalent group containing an acidyl radical, $n$ a number less than seven, $n'$ a number less than 5, and X' for substituting groups.

11. The process of producing ureids having valuable therapeutic properties which comprises treating a solution of sodium para-aminobenzoyl-8.1-amidonaphthol-4.6-disulfonate with phosgen in the presence of sodium acetate at a temperature of about 40–45° C.

12. As new products ureids of substituted amino-naphthol substances characterized by the following general formula:

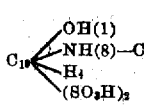

forming salts with metals, and forming azodyestuffs with diazotized anilin, substantially as described.

In testimony whereof we have hereunto set our hands in the presence of two subscribing witnesses.

BERNHARD HEYMANN.
OSKAR DRESSEL.
RICHARD KOTHE.
ANTON OSSENBECK.

Witnesses:
 HANS BRÜCKNER,
 LOUIS VANDORY.